United States Patent [19]

Kozyrski et al.

[11] Patent Number: 5,014,436
[45] Date of Patent: May 14, 1991

[54] CIRCLE CUTTING SYSTEM

[75] Inventors: Vincent T. Kozyrski; Claude R. Millett, both of Plainville, Conn.

[73] Assignee: The Fletcher-Terry Company, Farmington, Conn.

[21] Appl. No.: 476,630

[22] Filed: Feb. 8, 1990

Related U.S. Application Data

[63] Continuation-in-part of Ser. No. 231,728, Aug. 12, 1988, Pat. No. 4,916,820.

[51] Int. Cl.⁵ .................... B26D 3/08; C03B 33/10
[52] U.S. Cl. ..................... 33/27.03; 33/27.031; 30/164.95; 225/96; 83/886
[58] Field of Search ............ 30/164.95, 164.9, 300, 30/310; 83/879, 886, 745, 455; 225/96; 33/27.01, 27.03, 42, 41.5

[56] References Cited

U.S. PATENT DOCUMENTS

| | | |
|---|---|---|
| 959,311 | 5/1910 | Chase, Jr. |
| 992,819 | 5/1911 | Springer |
| 1,421,921 | 7/1922 | Doerr ........................... 33/27.03 |
| 1,598,993 | 9/1926 | Ulazny ....................... 33/27.03 X |
| 1,773,048 | 8/1930 | Linke ........................... 30/300 |
| 2,134,332 | 10/1938 | Hubbard ...................... 143/86 |
| 3,111,761 | 11/1963 | McAlister, Jr. ................. 33/27 |
| 3,491,448 | 1/1970 | Quinton et al. ................. 33/27 |
| 4,044,464 | 8/1977 | Schiess et al. ................. 30/164.9 |
| 4,083,274 | 4/1978 | Insolio et al. ................. 83/481 X |
| 4,110,907 | 9/1978 | Einhorn et al. ................. 30/164.95 |
| 4,277,889 | 7/1981 | Oberg .......................... 30/164.95 |
| 4,590,834 | 5/1986 | Sobel .......................... 83/455 |
| 4,858,322 | 8/1989 | Kluga ......................... 30/164.9 X |
| 4,939,968 | 7/1990 | Stoof .......................... 83/886 |

*Primary Examiner*—Douglas D. Watts
*Assistant Examiner*—Rinaldi Rada
*Attorney, Agent, or Firm*—Ira S. Dorman

[57] ABSTRACT

Apparatus for manually cutting circles from glass utilizes a center support structure, in combination with a rule having a distance scale thereon, and a cutting head adjustably mounted on the rule. Reversal of the position of the cutting head on the supporting rule adapts it for use with either of two different forms of cutting components.

7 Claims, 4 Drawing Sheets

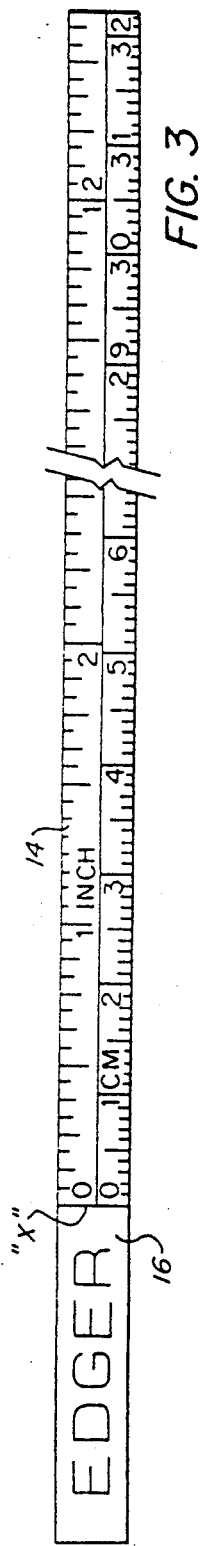
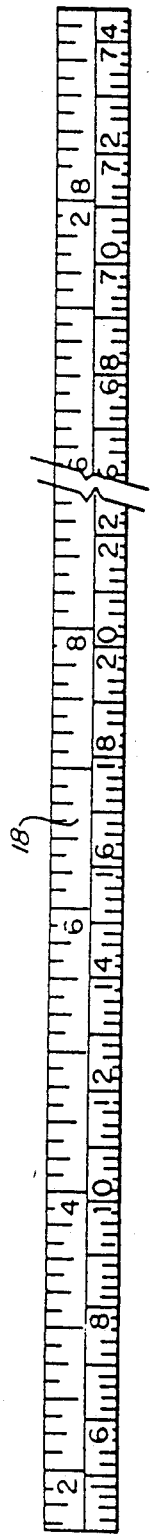
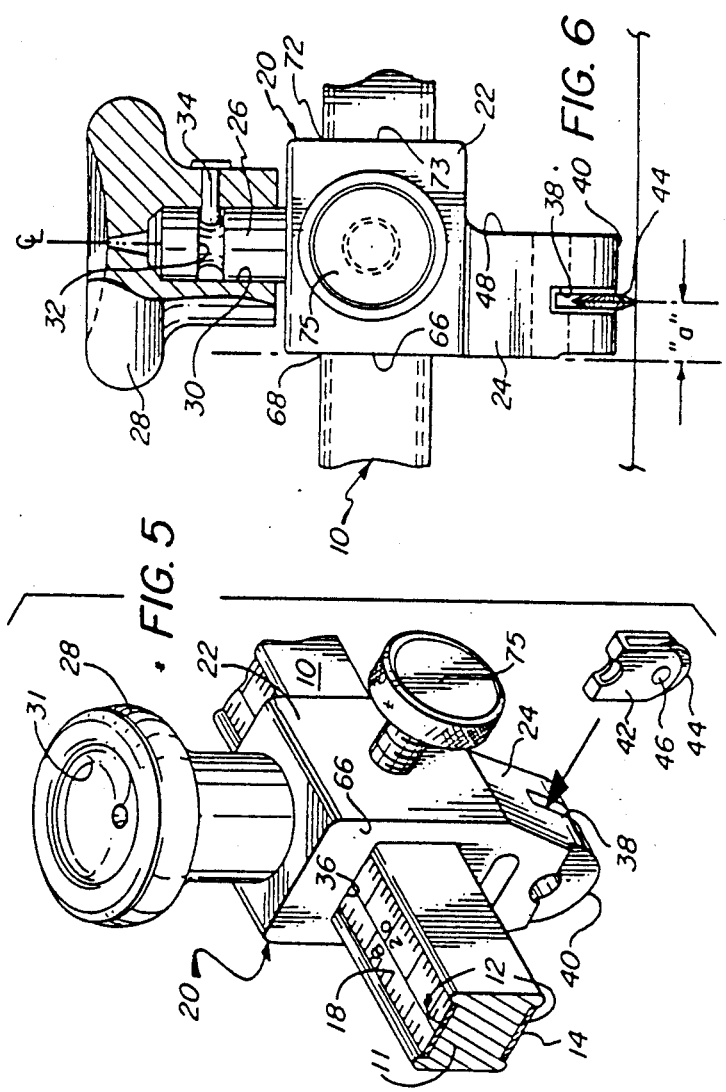
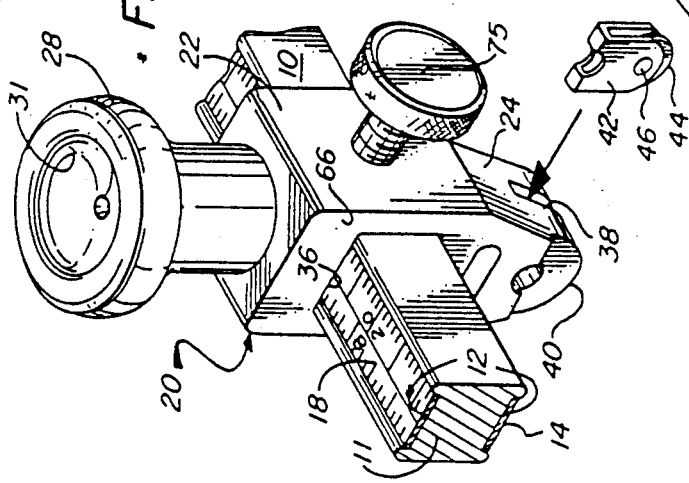

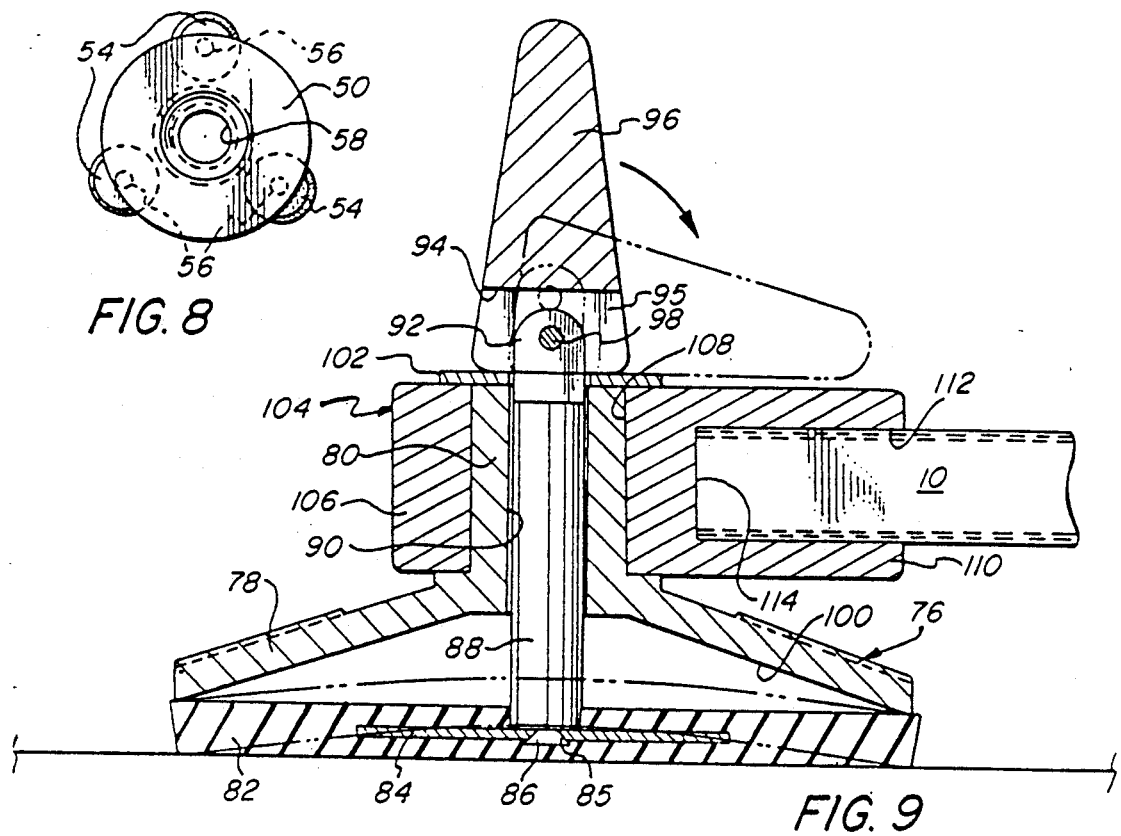
FIG. 8
FIG. 9
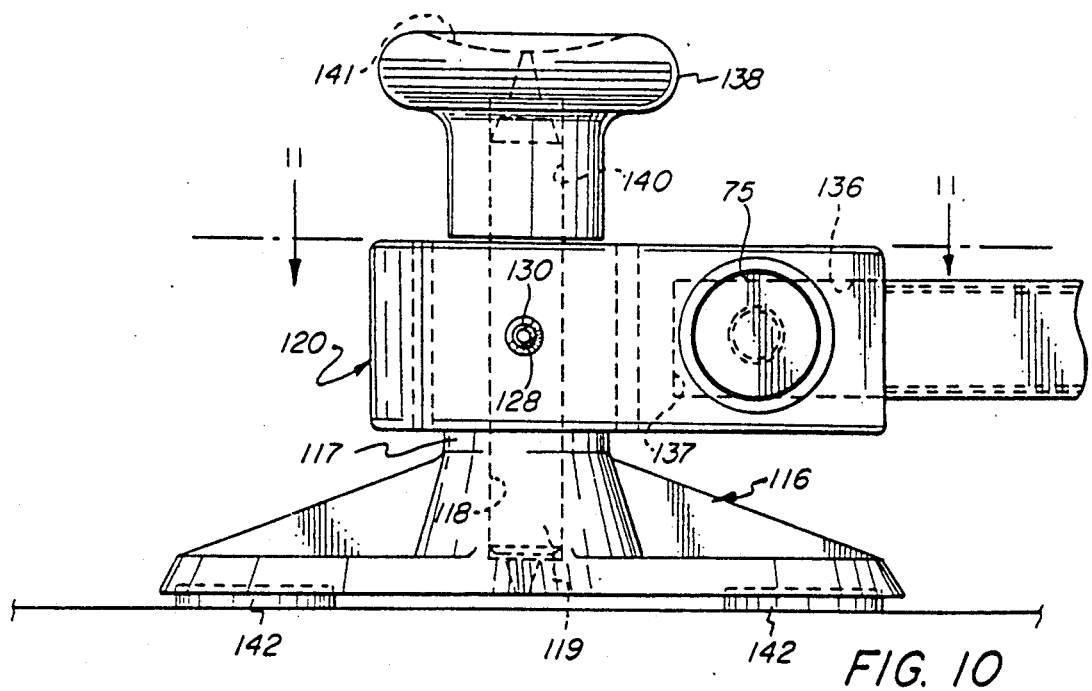
FIG. 10

CIRCLE CUTTING SYSTEM

CROSS REFERENCE TO RELATED APPLICATION

This application is a continuation-in-part of copending U.S. patent application Ser. No. 07/231,728, filed Aug. 12, 1988 and now issued as U.S. Pat. No. 4,916,820.

BACKGROUND OF THE INVENTION

Devices for manually cutting circles from pieces of glass have long been known and are commerically available. They typically consist of a central supporting structure, to which is pivotably attached a radially extending arm, which in turn serves to mount a cutting head for movement in a circular path about the supporting structure. The mounting arm will normally be provided with a distance scale to facilitate setting of the head of cutting a circle of the desired diameter.

Nevertheless, a demand exists for apparatus which is adapted to enable cutting of circles from sheet materials, such as glass and the like, to precise specifications and in different modes of operation, and which is facile and convenient to use and relatively inexpensive to produce. It is, accordingly, the object of the present invention to provide a novel system which has those features and affords those capabilities.

SUMMARY OF THE INVENTION

It has now been found that the foregoing and related objects of the present invention are attained by the provision of a mechanical system that includes a rigid rules, a cutting head, and a pivot base assembly. The rule is elongated and rectilinear, and has a scale with distance-indicating indicia thereon. The cutting head is reversible, and includes a body with a laterally extending passageway having opposite ends and configured to recieve the rule inserted longitudinally thereinto, to slidably mount the head; means is provided for disengageably securing the head at any selected position therealong. Registry elements, provided on the body and lying in lateral planes at the opposite ends of its passageway, are adapted for readable registry with the indicia of the rule scale. The body has first and second means for disengageably mounting a cutting component to act in first and second planes of the body, respectively. The "first" plane lies nonsymmetrically between the lateral planes at the ends of the body passageway, and is spaced by a certain distance from one of the registry elements; the second plane also lies nonsymmetrically between the lateral planes, and is spaced by the same distance from the other registry element. The base of the pivot assembly is adapted to provide stationary support for the system, and it has a coupling fixture that is rotatably mounted thereon and that has means for disengageably securing an end portion of the rule for radial extension therefrom.

In the preferred embodiments, the rule scale will have numeric indicia of ascending values thereon, commencing with an indicium having a value greater than zero and being indicative of the distance from the axis of pivoting of the coupling fixture when the rule is secured in a predetermined reference position. The scale will desirably be graduated to show double the actual distances, to thereby designate the diameters of circles circumscribed. Legend means will advantageously be provided on the cutting head to correlate each of the registry elements to either the "first" or the "second" cutting component, so as to facilitate proper positioning of the head.

The base of the pivot assembly will usually have an upstanding cylindrical portion, and the coupling fixture used therewith will include a collar portion engaged upon the cylindrical portion and rotatable about the base. The securing means of the coupling fixture may comprise an arm portion, having an inwardly extending recess that is adapted to receive the end portion of the rule.

BRIEF DESCRIPTION OF THE DRAWINGS

FIG. 3 is a fragmentary plan view of a scale element for the rule utilized in the system of the invention, drawn to a scale englarged from that of FIG. 1 and 2;

FIG. 4 is a view similar to that of FIG. 3, showing a second scale element for the rule;

FIG. 5 is a fragmentary perspective view, drawn substantially to the scale of FIGS. 3 and 4, showing the cutting head of the system mounted upon ther rule, with the cutting component displaced therefrom;

FIG. 6 is a fragmentary, side elevational view of the cutting head mounted upon the rule, with the single-wheel cutting component in place and with the handle shown in partial section;

FIG. 7 is a view similar to that of FIG. 6, with the cutting head inverted on the rule and mounting a turret-like, multi-wheel cutting components, and with the lower portion of the body shown in section;

FIG. 8 is a plan view of the cutting component utilized in the assembly of FIG. 7;

FIG. 9 is a fragmentary, vertical sectional view of the device of FIG. 2, taken along line 9—9 thereof and drawn to an enlarged scale, alternative positions of the evacuating mechanism thereof being shown in full and phantom line;

FIG. 10 is a fragmentary, side elevational view of a system provided by the instant invention, utilizing a tripod form of pivot base assembly.

DETAILED DESCRIPTION OF THE ILLUSTRATED EMBODIMENTS

Figure 1:
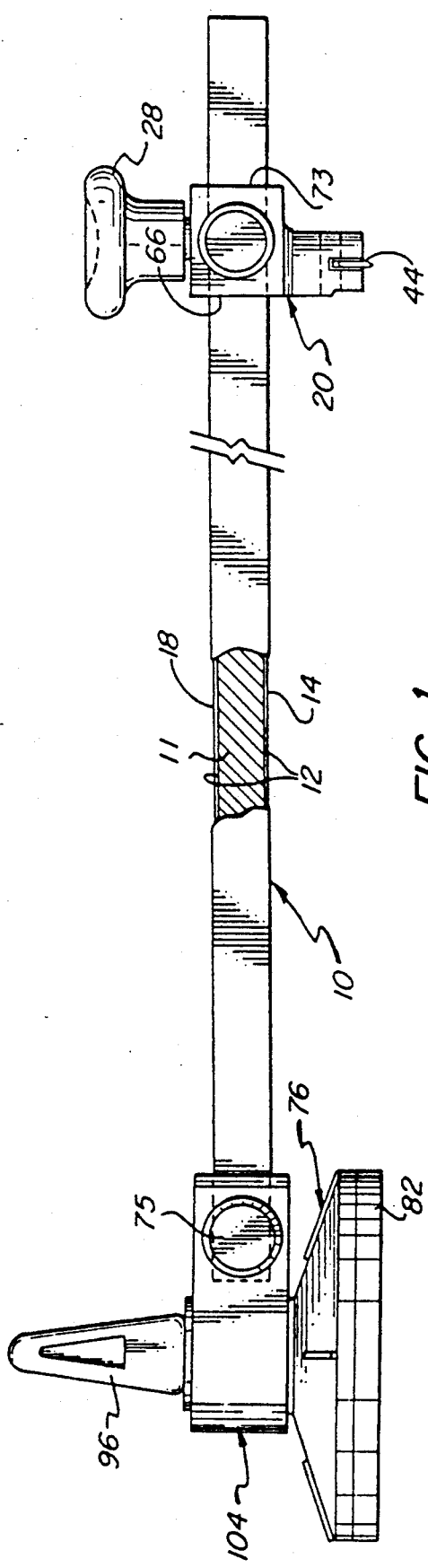
FIG. 1 is a fragmentary side elevational view of a mechanical system embodying the invention, with a portion broken away to show detail.
Figure 2:
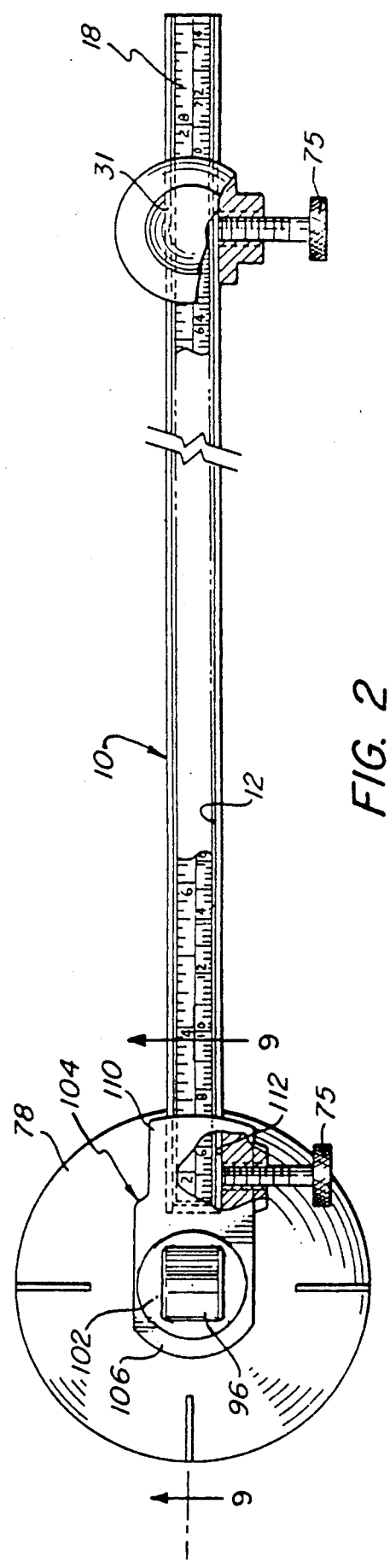
FIG. 2 is a fragmentary plan view of the device of FIG. 1, also having portions broken away.

Turning now in detail to the appended drawings, the system of the invention utilizes a rigid, elongate, rectilinear rule, generally designated by the numeral 10, consisting of a body 11 of square cross section having shallow channels 12 running along its length and on opposite sides thereof. Each of the channels 12 seats one of the scale elements 14, 18, which are illustrated in greatest detail in FIGS. 3, and 4 and consist of plastic strips secured within the channels, upon which linear distance indicia are printed. The scale element shown in FIG. 3 has an end portion 16 bearing the word "EDGER", bordered by a zero reference point (the line designated "x" in the Figure); the scale extending therefrom is in actual inches or centimeters, as indicated, and is provided to adapt the rule for use as a component of a strip-cutting assembly, as it may be. The scale on the element 18 is denoted however in double-length (i.e., twice actual) distances, thereby enabling it to be used to read diameter measurements directly; it will also be noted from FIG. 4 that the scale begins at approximately the 1¾ inch marks, the reason for which will be discussed hereinafter.

With particular reference now to FIGS. 5-7, the cutting head utilized in the system of the invention is illustrated in detail, and is seen to include a body, generally designated by the numeral 20, having a generally cubic upper portion 22 and a reduced-dimension lower position 24. Projecting upwardly on the centerline of body 20 is a cylindrical post 26, upon which is seated a handle 28 having an upwardly extending bore 30, in which the post 26 is engaged, and a shallow depression 31 in its top surface. A circumferential groove 32 is formed into the post 26, and receives the tip of a small pin 34 which extends radially through a hole in the lower portion of the handle 28 to retain it in rotatable assembly.

A slot 38 extends transversely across the lower portion 24 of the body 20, and inwardly from the end surface 40. It serves to seat a cutting component, which consists of a U-shaped insert piece 42 carrying a cutting wheel 44 on a transverse axle 46 between its wall elements. The components is assembled with the body 20 simply by inserting it inwardly from the end surface 40 into the slot 38, and is held in place by frictional engagement of the wall elements upon the opposing surfaces defining the slot.

The bottom portion 24 of the body has a lateral surface 48 parallel to, but offset slightly from, the centerline of the body. A second form of cutting component, best seen in FIGS. 7 and 8, employs a turret disc 50 having a deep circumferential groove 52 thereabout in which are rotatably mounted three cutting wheels 54. The wheels 54 are mounted upon ball-form axles 56, which are equidistantly spaced from one another and from the central axis of the disc 50. The turret disc is mounted upon the body 20 by use of a screw 60, which extends through the laterally extending bore 62 of the body portion 24 and is threadably enaged within the aperture 58. A lock washer 64 is interposed between the lateral surface 48 of the body 20 and the confronting surface of the turret disc 50.

The edge 68, formed at the intersection of the passageway 36 with the lateral body surface 66, provides a registry element. The distance "a," between the plane in which it lies and that on which the edge of the cutting wheel 44 is disposed, is of significance. A comparable lateral surface 72 is provided on the upper body portion 22 at the opposite end of the passageway 36, and defines a like registry element 72 at the intersection of the lateral surface 73 therewith. As indicated in FIG. 7, the planes in which the elment 72 and the cutting edges of the wheels 54 of the turret assembly lie are spaced from one another by a distance "b," equal to distance "a".

Label 74, applied to one surface of the body, bears the notations "U-UNIT" and "TURRET", with arrows pointing to the opposite lateral surfaces 66, 73. These legends serve to indicate which of the two registry elements 68, 72 is to be employed as a reference for reading of the scale, depending upon which of the cutting components is in use. A thumb screw 75 extends into the body 20 from the opposite side, and serves of course to clamp the cutting head in desired position on the rule 10.

With particular reference now to FIG. 9, one form of center support is illustrated, and employs a pivot base, generally designated by the numeral 76, consisting of a conical lower portion 78 and a cylindrical portion 80 extending upwardly therefrom. An associated evacuating mechanism includes a flexible rubber disc 82, spanning the opening of the conical portion 78, within which is embedded a circular metal plate 84. The latter has a central aperture 85 within which a small lug 86 on the end of the cylindrical operating shaft 88 is formed; the shaft 88 extends through the bore 90 of the cylindrical portion 80 and has, on its upper end, an ear element 92 disposed within the slot 94 of an operating lever 96. A pin 98 extends through the ear element 92 and is engaged in the opposite wall elements 95 (only one of which is visible in the Figure) defining the slot 94, to maintain the parts in assembly while permitting pivotable movement of the lever 96, as indicated by the arrow. The lever 96 acts against a washer 102, seated upon the upper edge fo the cylindrical portion 80 of the base 76, and serves to elevate the shaft 88 when turned to the phantom line position shown. This of course causes the rubber disc 82 to be withdrawn into the space 100 under the conical portion 78, thereby creating a vacuum force to hold the center support in position on the surface of a workpiece.

The coupling fixture, generally designated by the numeral 104, used with the base 76 has a collar portion 106, through which extends a passageway 108 to circular cross section; the cylindrical portion 80 of the base 76 is inserted into the passageway 108 to rotatably mount the coupling fixture. Arm portion 110 extends radially from the collar portion 106, and has an inwardly extending recess 112 of square cross section, dimensioned to snugly receive the end portion of the rule 10, the latter bottoming against the end wall 114 when fully inserted and being secured in position by tightening of the thumb screw 75 on the arm portion 110.

Figure 11:
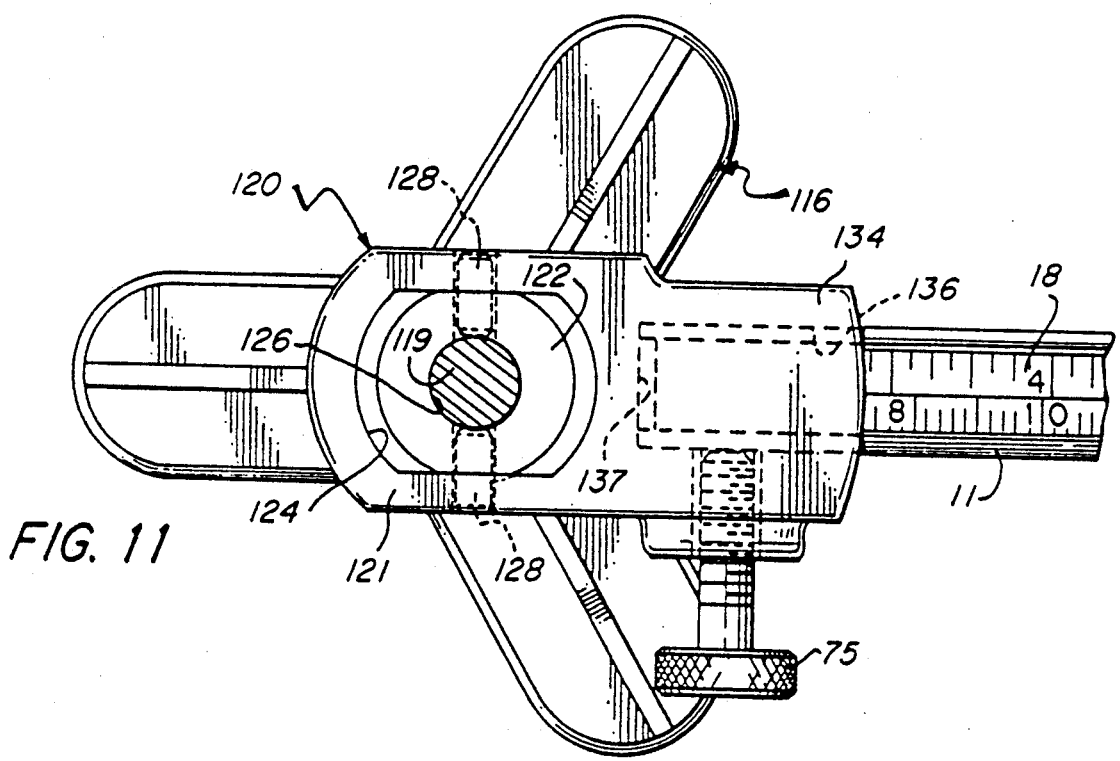
FIG. 11 is a substantially plan view of the device of FIG. 10, taken along line 11—11 thereof.

A different form of center support is shown in FIGS. 10 and 11, which is manually held in place during use. It includes a tripod base, generally designated by the numeral 116, having a downwardly extending central bore 118 in which is enaged the lower end of a metal shaft 119. A coupling fixture, generally designated by the numneral 120, has a collar portion 121 at one end defining a flat-sided oval opening 124, in which is seated a plug 122. The plug, in turn, has a passageway 126 of circular cross section extending through it and conforming in diameter to the shaft 119, thereby serving to rotatably mount the coupling fixture upon the base 116, the upstanding portion 117 of which provides underlying support. The collar portion 121 and the plug 122 have aligned, radially-extending apertures 130, in which small pins 128 are engaged to fasten the parts together. An arm portion 134 extends a radially from the collar portion 121 of the fixture, and has an inwardly extending recess 136 of square cross section corresponding to that of the rule body 11. The end portion of the rule 10 is inserted into the recess 136 and is bottom against the end wall 137 thereof; it is retained in place by tightening of the thumb screw 75 on the arm portion 134. Because the spacing between the curved surfaces on the plug 122 is less than that between the curved surfaces defining the opening 124 of the collar portion 121, taken along the longitudinal axis of the recess 136, the fixture 120 can also pivot on the pins 128 through a small angle in a vertical plane, thereby facilitating elevation of the cutting head, mounted on the rule 10, as desired.

The center support assembly also includes a knob 138, having an upwardly extending axial bore 140 by which it is mounted upon the upper end of the shaft 119. The shallow recess 141 formed into the top surface of the knob 138 facilitates the application of sufficient pressure to maintain the support in position, and rubber traction pads 142 are secured to the undersides of the three legs of the base for cushioning purposes and to prevent slippage so as to maintain the center support in position.

In will be appreciated that the rule 10 is inserted into the coupling fixtures 104, 120 (of both forms of center support) with the scale element 18 oriented upwardly for easy reading. It will also be appreciated that commencing the scale with a value above zero is necessary to take into account spacing from the axis of pivoting (represented by the center-line of either the shaft 88 or the shaft 119), so as to provide an accurate diametrical indication when the arm is fully inserted to afford a reference position.

Thus, it can be seen that the present invention provides a novel mechanical system which is adapted to enable cutting of circles from sheet materials, such as glass and the like, to precise specifications and in different modes of operation. The system is facile and convenient to use, and is of relatively uncomplicated and inexpensive construction.

Having thus described the invention, what is claimed is:

1. A mechanical system for cutting circles from glass and the like, comprising:

a rigid, elongated, rectilinear rule having a scale with distance-indicating indicia thereon;

a reversible cutting head, including a body with a laterally extending passageway having opposite ends and configured to receive said rule, inserted longitudinally into said passageway, for slidably mounting said head on said rule, and means for disengageably securing said head on said rule at selected positions therealong, said body having registry elements thereon lying in lateral planes at said opposite ends of said passageway and adapted for readably registry with said indicia of said rule scale, said body also having a first and second cutting component-mounting means, each adapted for disengageably mounting a cutting component thereon, said first mounting means being adapted to mount a cutting component to act in a first plane of said body, said first plane lying nonsymmetrically between said lateral planes and being laterally spaced by a certain distance from one of said registry elements, said second mounting means being adapted to mount a cutting component to act in a second plane of said body, said second plane lying nonsymmetrically between said lateral plane and being laterally spaced by said certain distance from the other of said registry elements; and a pivot base assembly, including a base adapted to provide stationary support for said system, and a coupling fixture rotatably mounted on said base and having means for disengageably securing an end portion of said rule for radial extension therefrom, whereby a cutting element, mounted to act in either said first plane or said second plane of said cutting head body, can be disposed in any selected plane, transverse to the longitudinal axis of said rule, by registry of said one or said other registry element of said cutting head body with a selected indicium of said scale.

2. The system of claim 1 wherein said rule scale has numeric indicia of ascending values thereon commencing with an indicium having a value greater than zero, said indicia being indicative of distances from the axis of rotation of said coupling fixture when said rule is secured, in a predetermined reference position, by said securing means thereof.

3. The system of claim 2 wherein said scale is graduated to designate double the actual distances, on said rule, to designate the diameters of circles circumscribed by a cutting component mounted on said cutting head and revolved about said base.

4. The system of claim 2 wherein said base of said pivot base assembly has an upstanding cylindrical portion thereon, and wherein said coupling fixture includes a collar portion engaged upon said cylindrical portion of said base and rotatable thereabout, said securing means of said fixture comprising an arm portion extending radially from said collar portion and having a recess extending inwardly thereinto and adapted to receive said end portion of said rule, and including a fastener for disengageably affixing said rule in position said recess said reference position being established with said rule end portion inserted fully into said recess.

5. The system of claim 1 wherein said cutting head body has an upper portion through which said passageway extends, with lateral surfaces spaced to opposite sides of an axis perpendicular to the axis of said passageway, said body also having a edges at the ends of said passageway providing said registry elements, and having a lower portion on which said first and second mounting means are provided.

6. The system of claim 1 wherein said body has a lower portion on which said first and second mounting means are provided; wherein said first mounting means comprises a recess formed into an end surface of said lower portion of said body and adapted to receive and engage an insert piece rotatably mounting a cutting wheel on a transverse axis; and wherein said second mounting means comprises a lateral surface on said lower body portion adapted to seat a turret disc, said disc having a plurality of cutting wheels mounted about its circumference said system including an axle member for affixing such a turret disc upon said lateral surface of said lower body portion for rotation about a central axis thereof.

7. The system of claim 1 wherein said cutting head has legend means thereon correlating said registry elements to said first and second cutting components, for registry with said rule indicia for selective positioning of said head therealong.

* * * * *

UNITED STATES PATENT AND TRADEMARK OFFICE
CERTIFICATE OF CORRECTION

PATENT NO. : 5,014,436

DATED : May 14, 1991

INVENTOR(S) : Vincent T. Kozyrski and Claude R. Millett

It is certified that error appears in the above-identified patent and that said Letters Patent is hereby corrected as shown below:

Claim 1, column 5, line 45, delete the word "readably" and substitute therefor --readable--.

Claim 1, column 5, line 57, delete the word "plane" and substitute therefor --planes--.

Claim 4, column 6, line 31, insert the word "within" after the word "position".

Signed and Sealed this

Eighth Day of September, 1992

Attest:

DOUGLAS B. COMER

*Attesting Officer*    Acting Commissioner of Patents and Trademarks